United States Patent [19]
Hayashi et al.

[11] Patent Number: 5,427,176
[45] Date of Patent: Jun. 27, 1995

[54] PNEUMATIC TIRE INCLUDING AT LEAST ONE TIE-ELEMENT LAYER WITH SUBSTANTIALLY ORTHOGONALLY ORIENTED CORDS

[75] Inventors: Kazuo Hayashi; Shizuo Iwasaki, both of Tokyo, Japan

[73] Assignee: Bridgestone Corporation, Tokyo, Japan

[21] Appl. No.: 167,011

[22] Filed: Dec. 16, 1993

[30] Foreign Application Priority Data

Dec. 24, 1992 [JP] Japan .................................. 4-344675

[51] Int. Cl.⁶ ........................... B60C 9/18; B60C 9/20; B60C 17/06
[52] U.S. Cl. ..................... 152/517; 152/454; 152/531; 152/534; 152/535; 152/536; 152/555
[58] Field of Search ........ 152/517, 555, 531, 534–536, 152/454

[56] References Cited
U.S. PATENT DOCUMENTS

| | | | |
|---|---|---|---|
| 2,493,614 | 1/1950 | Bourdon | 152/534 |
| 4,779,658 | 10/1988 | Kawabata et al. | 152/555 X |
| 4,917,164 | 4/1990 | Ushikubo et al. | 152/517 |
| 5,217,549 | 6/1993 | Johnson | 152/517 |

FOREIGN PATENT DOCUMENTS

| | | | |
|---|---|---|---|
| 0515226 | 11/1992 | European Pat. Off. | 152/555 |
| 2425334 | 12/1979 | France | 152/517 |

OTHER PUBLICATIONS

*Mechanics of Pneumatic Tires*, Ed. Samuel Clark: U.S. Department of Transportation, Aug. 1981, p. 63.

Primary Examiner—Adrienne Johnstone
Attorney, Agent, or Firm—Sughrue, Mion, Zinn, Macpeak & Seas

[57] ABSTRACT

A pneumatic radial tire comprising a pair of bead portions and sidewall portions and a tread portion connecting the sidewalls. At least one radial carcass layer reinforcing said portions is positioned between two beads embedded in the bead portions. A belt comprises at least two layers having cords crossing each other from one layer to the next, a cap circumferentially wound having organic fiber cords therein and reinforcing rubber layers in an entire region of the side wall portions supporting a load of the tire having a crescent shaped cross section along an inner side of the carcass. At least one tie-element layer resisting force generated in width directions of the tire and having many cords oriented substantially orthogonally with respect to an equatorial plane of the tire is arranged between the belt and the cap.

5 Claims, 2 Drawing Sheets

PNEUMATIC TIRE INCLUDING AT LEAST ONE TIE-ELEMENT LAYER WITH SUBSTANTIALLY ORTHOGONALLY ORIENTED CORDS

BACKGROUND OF THE INVENTION (1) Field of the Invention

This invention relates to a so-called "Run Flat Tire" which has a reinforcing rubber layer in the entire region of the sidewall. The layer has a crescent shaped cross section in order to enable vehicles to run over long distance when the tire is punctured. More particularly, this invention relates to a tire with good run flat durability which can be run over a long distance when punctured without developing trouble as compared with conventional run flat tires by reinforcing the tread portion of the tire properly.

(2) Related Art Statement

In order to enable a vehicle to continue to run safely for a relatively short distance and get to a location the driver desires, for example, a service station where the tire can be replaced there without disadvantages such as further damage to the tire or loss of maneuverbility when inner pressure of the tire fitted to the vehicle is reduced or completely deflated by some trouble mainly such as nails or metal pieces or the like (called "puncture" hereinafter), a lot of solutions have been provided.

Among them, employment of a reinforcing layer in the entire region of the side wall portions is a so called "Run Flat Tire" and is generally adopted as a most efficient measure. In this solution, a load of the tire is supported mainly by normal inner pressure and secondarily by the reinforcing layer under the normal operating conditions. The load is taken over by the reinforcing layer alone in the punctured state.

In the punctured state, the sidewall portions of a pneumatic tire, without a reinforcing layer, cannot stand the wheel weight, and are crushed into a conduplicate shape. This results in a fatal destruction of the tire and loss of dynamic properties. In the run flat tire, however, although the sidewall portions are bent considerably, the pneumatic radial tire can continue to run by adopting the reinforcing layer with shape and material capable of bearing wheel weight for a relatively short distance without damaging the component of the sidewall portions and still providing control of the vehicle.

The above mentioned run flat property is generally adopted to a high performance tire. In this regard, various dynamic properties such as steering property and anti vibration riding comfortability to be performed throughout the driving period must be maintained at a maximum level. Therefore, any deterioration of functional tire performance brought by adopting a run flat property used for just the puncture contingency must be minimumized.

In the selection of cross section shape and material of the reinforcing rubber layer, a decision and adoption within a limited thickness and hardness of the layer are necessary. Consequently, though it can be run safely for a certain distance, a limitation for running distance occurs. Though it has a structural disadvantage for run flat property, currently a radial carcass pneumatic tire has become popular. To satisfy the demand for extending safety running distance in the puncture state, prior run flat tires no longer meet this requirement, and improvement has been desired.

SUMMARY OF THE INVENTION

It is a object of this invention to provide a pneumatic tire with excellent run flat durability which is able to extend the running distance. It is a further object to provide such a tire which will run safely in the puncture state by selecting a shape and material of the reinforcing rubber layer to maintain performance of the tire at a maximum level of performance within the conventional range for the tire under normal running conditions.

By investigating movement of the deformation of the conventional run flat tire in the punctured state, the inventors have found that bending deformation in the sidewall portions has a close relation with resisting force for bending deformation in the tread portion. Based on this recognition, the inventors have been able to provide a pneumatic tire with excellent run flat durability by adopting construction of the invention described below.

In order to achieve these object, there is provided a pneumatic radial tire comprising a pair of bead portions and sidewall portions and a tread portion connecting the sidewall portion and including at least one radial carcass layer reinforcing said portions between two beads embedded in the bead portions. A belt comprises at least two layers having cords crossing each other from one layer to the next a cap circumferentially wound having organic fiber cords therein and reinforcing rubber layers in the entire region of the sidewall portions supporting a load of the tire having a crescent shaped cross section along an inner side of the carcass. At least one tie-element layer resisting force generated in width directions of the tire and having many cords oriented substantially orthogonally with respect to an equatorial plane of the tire is arranged between the belt and the cap.

BRIEF DESCRIPTION OF THE DRAWINGS

For a better understanding of the invention, reference is made to the attached drawings, wherein:

The first embodiment of the invention will be explained with reference to FIG. 1. FIG. 1 illustrates a semi cross sectional view of a pneumatic tire according to the present invention. The tire includes a carcass 1, a bead core 2, a belt 3, a cap 4, a tread portion 5, a sidewall portion 6, a bead portion 7, a reinforcing rubber layer 8, and a tie-element 9. The tire further includes an inner liner 10 and end cap layers 11.

Figure 1:
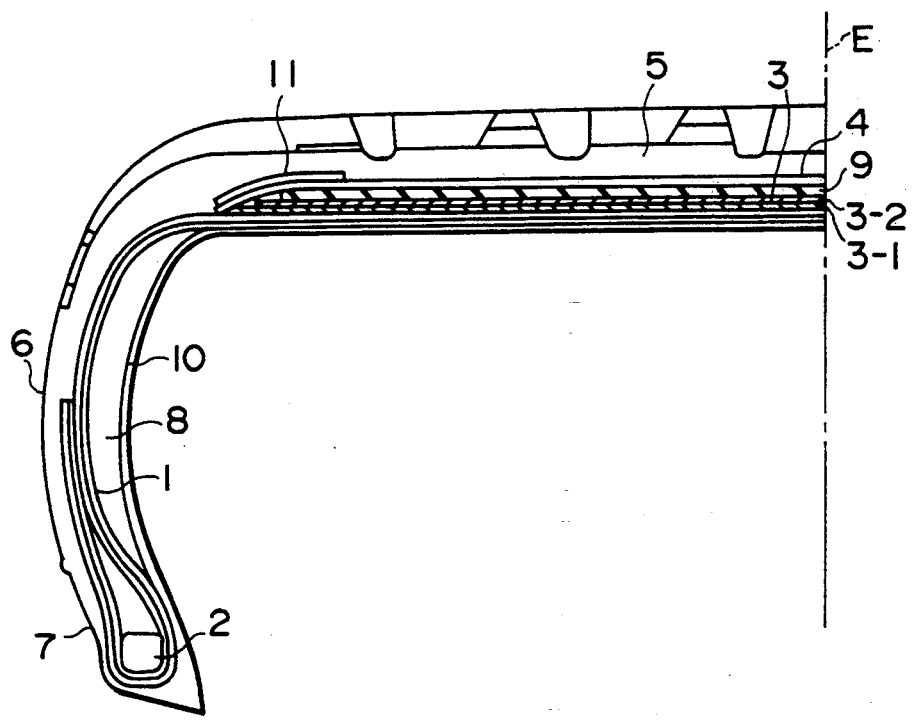
FIG. 1 shows a semi cross section of a tire according to a first embodiment of the present invention.

The invention comprises at least one carcass ply(two plies illustrated in the drawing) containing many cords oriented orthogonally with respect to an equatorial plane E of the tire. This carcass reinforces bead portion 7, sidewall portion 6 and tread portion 5 between a pair of bead cores 2 embedded in a pair of bead portions 7 (only one side of the bead portion is shown).

The belt 3 comprises at least two cord crossing layers (3-1, 3-2 in the drawing). The cords of the layers are arranged obliquely in opposite directions from one layer to the next with respect to the equatorial plane E, which forms small crossing angles between the layers.

The cap 4 is circumferentially wound having organic fiber cords and prevents the belt 3 from expansion in a radial direction during running at a high speed. The cap 4 must have a width wider than that of the belt 3. The cap 4 improves running performance of a high performance tire by reinforcing the tread 5 working together with the belt 3.

The reinforcing rubber layer 8 preferably must be a rubber with hardness which is harder than that of a rubber used in the carcass 1 and a rubber used in the side wall portions 6. Though the rubber reinforcing layer functions as a load supporting component under a normal inner pressure in an auxiliary capacity, the main object of the rubber reinforcing layer is to enable the sidewall portions 6 to support the load not perfectly but sufficiently which can not be supported by the side rubber and the carcass ply alone when inflation pressure is lost. So, the rubber reinforcing element works as "stay element". Therefore, the reinforcing rubber layer 8 must be arranged in the entire region of the sidewall portions 6, more particularly from the side region of the bead core 2 in a radial direction to the side edge of the tread 5 along the inner surface of the carcass 1. It is tapered gradually in a cross section with its maximum thickness at or near the center of the region.

Further, between the belt 3, more particularly the outer layer 3-2 of two cord crossing layers and the cap 4, at least one tie-element layer having many cords arranged substantially orthogonally with respect to the equatorial plane of the tire is arranged.

The cords of the tie-element 9 extend essentially radially thus crossing and covering small depressions and cords crossing each other in the belt. So the tie-element 9 works as component resisting the force generated in the tread 5 in a width direction. The width must be at least 50% of the narrower belt ply among the plural plies.

The cord used for the tie-element must have high tensile modulus or high compression modulus. For example, aramid fiber twist cord for the former requirement and nylon monofilament cord for the latter requirement.

The end cap 11 in FIG. 1 is a narrow cord layer wound in a certain designated region in a width direction along outer surface of the belt 3 and the cap 4. In FIG. 1, the end cap 11 covers both side edges of the belt 3 and the cap layer 4 to improve performance at high speed running.

Figure 2:
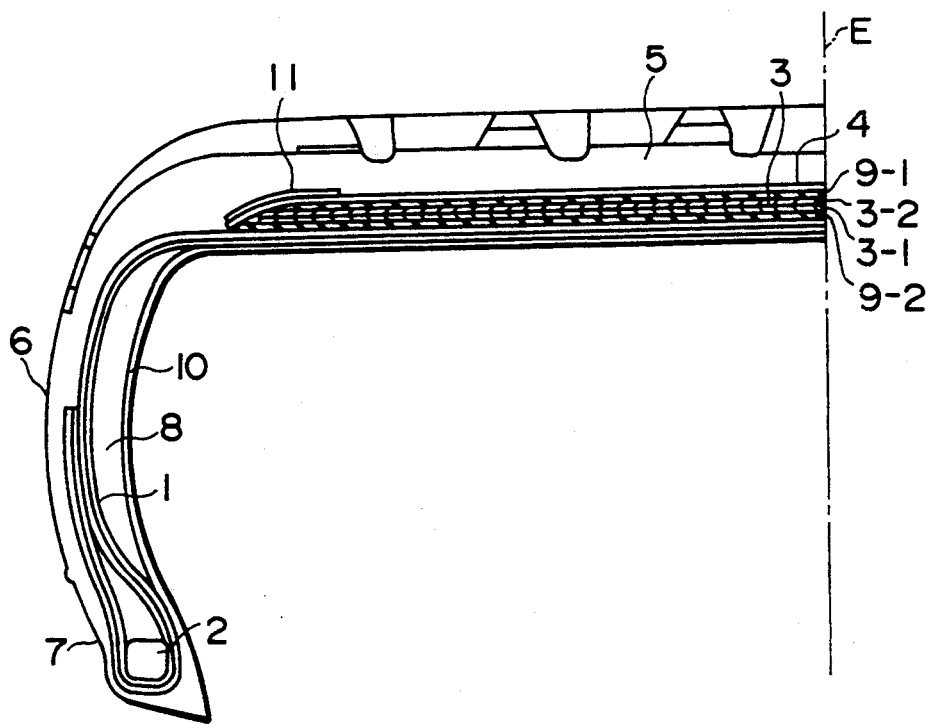
FIG. 2 shows a second embodiment of the present invention in a semi-cross section.

FIG. 2 is a semi-cross section the same as FIG. 1 in which two tie element layers 9-1 and 9-2 are arranged. The tie-element 9-1 is arranged in the same manner as in FIG. 1 and the tie-element 9-2 is arranged between the inner cord crossing layer 3-1 and the carcass 1. The belt 3 is positioned between the two layers 9-1 and 9-2. This constitutes a second embodiment of the invention.

Figure 3:
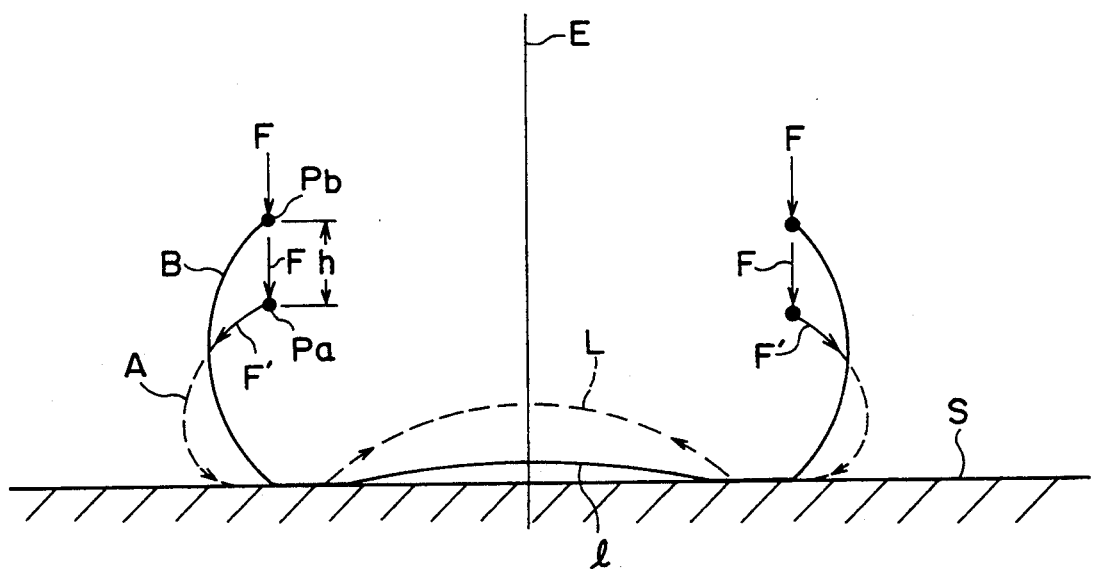
FIG. 3 shows behavior of a tire in a puncture state.

In FIG. 3, a broken line A of a conventional run flat tire and a solid line B of the present invention illustrates the deformation of outer profile of the run flat tire having above mentioned reinforcing rubber layer 8 just under the load of the wheel weight. Pa and Pb respectively show force application point from rim flange to the bead 7 of the broken line A and the solid line B. S defines road surface.

Though it is not illustrated in the drawing, the conventional tire, without reinforcing rubber layer 8, would be crushed because of lack of any load support property. The conventional run flat tire functions to support the load generated by deformation of the sidewall as illustrated by broken line A. This function is obtained by the deformation resistance property of the reinforcing rubber layer 8 having large thickness portions 6 at substantially the center of the sidewall portions which is brought about by the rubber's own large compression modulus for deformation inside the reinforcing rubber 8.

Because of this load support property, however, the component force F' of wheel weight is directed as shown by arrows and is transmitted to both ends of the tread 5 through reinforcing rubber layer 8. At this time, because the belt 3 and the cap 4 have no tension without internal pressure, the tread 5 cannot resist this force. The tread 5, therefore, is curved to the inner side of the tire shown by arc L in FIG. 3. Consequently, the sidewall portion 6 is deformed such that some portions close to the tread 5 contact the road surface and rotate with slipping contact. This results in rapid abrasion of the rubber and damage of the carcass 1 at early stage.

In the FIG. 3 curving of the tread 5 shown by Arc L corresponds to decreasing of radius of movement. This results in increasing the oblique angles of the cords of cord intersecting layer 3-1, 3-2 of the belt 3, which means enlargement of a gap formed between the cords and correspondingly decreasing the depth. This is so called "Pantograph phenomenon" caused by spreading between two linear components.

By arranging tie-element 9 (9-1) having many cords orthogonal with respect to the equatorial plane E of the tire between the cord intersecting layer 3-2 of the belt 3 and the cap 4, enlargement, that is, the Pantograph phenomenon, is efficiently restrained. This restraint prevents the tread 5 from curving as is described by the line 1 of FIG. 3.

Consequently, a length of the curvature of the tread 5 is reduced from L of conventional tire to 1 of the present invention. This results in pushing up the bead 7 from point Pa to Pb which is higher than Pa by h. Thus, slipping contact of the sidewall portions 6 with the road surface S is reduced drastically. Further portions having a large thickness between the carcass 1 are supposed to contact the road surface and such is assured.

Moreover, by arranging the tie element 9-2 additionally between the cord intersecting layer 3-1 and the carcass 1, the above effect can be further improved.

Although in a conventional run flat tire, the load supporting property of the reinforcing rubber layer 8 cannot be worked sufficiently, the reinforcing rubber layer 8 in the present invention can be performed sufficiently by arranging the tie-element 9 (9-1, 9-2).

DETAILED DESCRIPTION OF THE INVENTION

To evaluate this invention, a high performance passenger pneumatic radial tire whose construction was same as that of FIG. 1 and FIG. 2 was prepared. The size was P275/40ZR17. The carcass was comprised of two plies having rayon cord. The belt 3 comprises 2 layers having steel cord arranged at an angle of 30° with respect to the equatorial plane of the tire. The cap 4 is comprised of one layer having nylon cord and the end cap layer 11 is comprised of two portions each having nylon cord. The reinforcing rubber layer 8 is rubber stock whose hardness is JIS hardness 84 and maximum thickness is 7 mm.

In the tires with the construction described above, as a tie element, one layer having aramid fiber cord in example 1 and one layer having nylon monofilament cord in example 2 were used. In examples 3 and 4 adopting two tie-element layer 9-1, 9-2, aramid fiber layer for both 9-1 and 9-2 and a nylon monofilament cord layer for 9-1 and a aramid fiber cord layer for 9-2 are respectively used. For the monofilament cord, "HYTEN" a cord manufactured by DUPONT is used. The widths of tie-element 9, 9-1 and 9-2 are 98% width of the narrowest cord crossing layer.

For each tire of examples 1–4 and a conventional tire without tie-element but of the construction as above, an experiment has been performed. A vehicle was run in a puncture state caused by pulling out the bulb core at a speed of 90 Km/h in a circuit until significant damage was generated to the tires.

An evaluation was made based on distance until generation of the damage by using index showing 100 for the conventional tire. Results were 200 in the example tire 1, 400 in the example tire 2, 230 in the example tire 3 and 460 in the example tire 4.

From above evaluation results, a remarkable effect of tie-element was found. Especially, high improvement occurred. Example 2 with the tie-element outside portion of belt 3 is affected by compression force when curvature made of nylon monofilament cord which has a compression resistance property. Also, Example 4 with tie-element 9-2 inside the carcass 1 affected by stretching force made of armaid fiber cord which have stretching property besides 9-1 of embodiment 2 showed remarkable improvement over the 100 index tire.

According to the invention, the pneumatic tire has excellent run flat durability as well as a high level performance.

It is further understood by those skilled in the art that the foregoing description is that of preferred embodiments of the invention and that various changes and modifications may be made in the invention without departing from the scope thereof.

What is claimed is:

1. A pneumatic run flat radial tire comprising; a pair of bead portions and sidewall portions and a tread portion connecting the sidewall portions, a carcass comprising two radial carcass layers reinforcing said sidewall portions between two beads embedded in the bead portions, a belt comprising at least two layers having steel cords crossing each other positioned radially above said carcass layers, a cap layer circumferentially wound having organic fiber cords therein, reinforcing rubber layers one disposed in the entire region of each of said sidewall portions supporting a load of the tire and having a crescent shaped cross section and positioned along an inner side of the carcass, a single tie-element layer resisting force generated in width directions of the tire and having aramid cords arranged substantially orthogonal with respect to an equatorial plane of the tire, said single tie-element layer arranged between the belt and the cap layer.

2. The tire of claim 1 further comprising an end cap layer positioned at ends of said belt radially above said cap layer.

3. The tire of claim 2 wherein said cap layer comprises a nylon cord layer and said end cap layer comprises a layer of nylon cord.

4. The tire of claim 1 wherein said sidewall reinforcing rubber layers each extend from one of said bead portions to said tread portion and said sidewall reinforcing rubber layers are made of a rubber having a hardness greater than that of both the rubber in said carcass layers and the rubber in said sidewall portions.

5. The tire of claim 1 wherein said belt comprises two layers moving steel cords crossing each other at an angle of 30 degrees to the equatorial plane of the tire, and said cap layer comprises a nylon cord layer arranged at an angle of substantially 0 degrees to the equatorial plane of the tire.

* * * * *